(12) United States Patent
Desclos et al.

(10) Patent No.: US 9,014,699 B2
(45) Date of Patent: Apr. 21, 2015

(54) POWER MANAGEMENT AND CONTROL SYNCHRONIZATION WITHIN IN A WIRELESS NETWORK USING MODAL ANTENNAS AND RELATED METHODS

(75) Inventors: Laurent Desclos, San Diego, CA (US); Sebastian Rowson, San Diego, CA (US); Jeffrey Shamblin, San Marcos, CA (US)

(73) Assignee: Ethertronics, Inc., San Diego, CA (US)

( * ) Notice: Subject to any disclaimer, the term of this patent is extended or adjusted under 35 U.S.C. 154(b) by 261 days.

(21) Appl. No.: 13/523,678

(22) Filed: Jun. 14, 2012

(65) Prior Publication Data
US 2013/0150040 A1    Jun. 13, 2013

Related U.S. Application Data

(60) Provisional application No. 61/496,813, filed on Jun. 14, 2011.

(51) Int. Cl.
*H04W 52/00* (2009.01)
*H04W 36/16* (2009.01)
*H01Q 1/24* (2006.01)
*H01Q 3/44* (2006.01)
*H04W 52/14* (2009.01)
*H04W 52/36* (2009.01)

(52) U.S. Cl.
CPC .............. *H04W 52/00* (2013.01); *H01Q 1/243* (2013.01); *H01Q 3/44* (2013.01); *H04W 36/165* (2013.01); *H04W 52/143* (2013.01); *H04W 52/367* (2013.01)

(58) Field of Classification Search
USPC ...................... 455/418–420, 422.1, 436–444, 455/452.1–453, 575.7, 107, 120, 121, 129
See application file for complete search history.

(56) References Cited

U.S. PATENT DOCUMENTS

| | | | |
|---|---|---|---|
| 2005/0170839 A1* | 8/2005 | Rinne et al. .................... | 455/446 |
| 2009/0086648 A1* | 4/2009 | Xu et al. ........................ | 370/252 |
| 2009/0224991 A1* | 9/2009 | Rowson et al. ............... | 343/747 |
| 2011/0244866 A1* | 10/2011 | Yamamoto et al. ........... | 455/438 |

* cited by examiner

*Primary Examiner* — Kashif Siddiqui
(74) *Attorney, Agent, or Firm* — Coastal Patent Law Group, P.C.

(57) ABSTRACT

A means of power management and control via a reverse link of a CDMA or LTE network is disclosed. The protocol is set to superimpose itself in an agnostic way to the power management as one more layer of freedom is added. The adjustment depending on the power control is then derived by mismatch if too much power or antenna tuning to enhance the power. This is also following a table in the device that will adjust ECC in case of a MIMO transmission such as LTE as well as SAR. This will generate also a mean of a soft-handoff and load control on the base station.

13 Claims, 12 Drawing Sheets

| SYSTEM | LTE | | | GSM | | | CDMA | | |
|---|---|---|---|---|---|---|---|---|---|
| SPEED | SLOW | MED | HIGH | SLOW | MED | HIGH | SLOW | MED | HIGH |
| DELTA IN dB | BT1=20dB B;BT2=10dB | BT1=20dB BT2=10dB | BT1=20dB BT2=10dB | BT1=20dB BT2=10dB | BT1=20dB BT2=10dB | BT1=20dB BT2=10dB | BT1=20dB BT2=10dB | BT1=20dB BT2=10dB | BT1=20dB BT2=10dB |
| DATA RATE ASKED VERSUS TARGET | xMbps/ yMbps | xMbps/ yMbps | xMbps/ yMbps | xMbps/ yMbps | xMbps/ yMbps | xMbps/ yMbps | xMbps/ yMbps | xMbps/ yMbps | xMbps/ yMbps |
| CHANGE TIME | POSSIBLE IN xms | POSSIBLE IN xms | POSSIBLE IN xms | POSSIBLE IN xms | POSSIBLE IN xms | POSSIBLE IN xms | POSSIBLE IN xms | POSSIBLE IN xms | POSSIBLE IN xms |
| SAR VERSUS PATTERN CHANGE | OK/NOK | OK/NOK | OK/NOK | OK/NOK | OK/NOK | OK/NOK | OK/NOK | OK/NOK | OK/NOK |
| RESULTS | YES/NO | YES/NO | YES/NO | YES/NO | YES/NO | YES/NO | YES/NO | YES/NO | YES/NO |

*Fig. 6*

POWER MANAGEMENT AND CONTROL SYNCHRONIZATION WITHIN IN A WIRELESS NETWORK USING MODAL ANTENNAS AND RELATED METHODS

CROSS-REFERENCE TO RELATED APPLICATIONS

This application claims benefit of priority to U.S. Provisional Application Ser. No. 61/496,813, filed Jun. 14, 2011.

FIELD OF THE INVENTION

This invention relates to antenna systems for wireless communication; and more particularly to such antenna systems adapted for power management and control across a wireless network.

BACKGROUND OF THE INVENTION

With today's advanced networks and the proliferation of smart phones and other devices adapted for multi-media and other applications, consumer demand for data bandwidth is rapidly increasing, such that there is a need for dynamic management and control of network resources, including data transfer rate and the like.

Current wireless networks, such as 3G code division multiple access (CDMA), 4G long term evolution (LTE), and other network structures, are capable of adjusting signal characteristics such as signal direction, antenna gain, and other characteristics at the base transceiver system (BTS), or cell site, such that a robust signal link may be maintained with connected devices. Generally, adjacent BTS's utilize distinct frequency channels for communicating with wireless devices within each cell. Furthermore, each channel generally comprises two frequencies; one for voice transmission (speaking), and one for reception (hearing). Each BTS is capable of communicating with a plurality of wireless devices at any given instant in time. As wireless devices translate geographically, a hand-off is effectuated from a first BTS to a second BTS in such a manner as to maintain data transfer between the mobile wireless device and the network. During a handoff, the mobile device is configured to change frequencies such that communication can be effectuated with an adjacent BTS.

Cellular BTS's generally transmit over relatively low frequencies, allowing low power transmission effectively maximizing the operational use of a mobile device battery. In the US, such frequencies for use with wireless communications include 850 MHz and 1.9 GHz. Additionally, subsequent to establishing a connection with a BST, individual wireless devices are generally instructed by the BST to reduce power such that interference over the network is minimized and overall communication quality is improved.

Certain modern wireless systems, however, are limited in the amount of available channels (frequency pairs), power, and data transfer that may be administered between linked devices within the cell. The total communication threshold for a given BTS can be referred to as its link budget. For example, in a 3G CDMA network, a BTS may be configured to provide a data rate of about 3 Mbps to a linked device. By way of example, a 3-minute MP3 song may be downloaded in about 15 seconds at a data rate of 3 Mbps. These data transfer rates are accomplished by several complex digital compression and modulation techniques. As media requirements continue to grow, more users are requiring access to data transfer resources as demand for multimedia downloads increases over wireless networks.

Furthermore, there are often multiple BTS's located within proximity to an individual mobile wireless device at any given time. However, until now there has yet to be provided a system adapted to direct one or more mobile devices from a first BTS to a second BTS for the purpose of managing system resources such as bandwidth. In this regard, a first BTS might operate over a first group of frequencies, whereas a second BTS might operate over a second group of frequencies. It would be beneficial to provide a wireless device configured to "tune" from the first BTS to the second BTS upon a change in the antenna frequency response. This sort of power management handoff will require certain modal antenna technology, and software programmed between the wireless device and BTS for effectuating the handoff.

Certain platforms exist which enable improvements over current wireless schemes. For example, previously proposed in the art was a method for communicating power management data to a mobile device across a CDMA network. Specifically, U.S. Pat. No. 5,621,723, titled "POWER CONTROL IN A CDMA NETWORK" describes a modulated signal comprising forward packet data and forward packet control information over a forward link in a packet-switched CDMA network; the entire contents of which are hereby incorporated by reference. According to the '723 patent, a method includes carrying the packet data on the in-phase component of a quadrature-carrier signal, and carrying the packet data control information on the quadrature component of the quadrature-carrier signal. The '723 patent does not disclose antenna systems for processing the modulated signal. As such, there is a continued need for antenna systems adapted to utilize these and other signaling methods such that dynamic power management may become a reality across CDMA, LTE, and future networks.

Furthermore, commonly owned U.S. Pat. No. 7,911,402, titled "ANTENNA AND METHOD FOR STEERING ANTENNA BEAM DIRECTION" discloses multi-mode antennas for use in mobile wireless devices wherein said antennas are adapted to vary one or more signal characteristics, such as the antenna radiation pattern; the entire contents of which are hereby incorporated by reference.

With the advent of improvements in the field of wireless communications such as those described above, there is a need for development of specialized antenna systems adapted for power management and control over a wireless communication network, such as CDMA, LTE, and other wireless network platforms, such that data transfer and download speeds can become dynamically adjusted and optimized for mobile wireless devices over a robust network link. Other benefits would include power adjustment across multiple antenna modes for minimizing device interference and thereby improving network communications, and for dynamically adjusting specific absorption rate (SAR). It would be of further benefit to provide antenna systems adapted to hand-off those mobile wireless devices across multiple BTS's where there is a need for improved data transfer rates and where another BTS may provide an increase in power, and thus available bandwidth. Still further, there is a need to optimize and dynamically control network resources within localized cells for improving data access over a given network.

SUMMARY OF THE INVENTION

A network antenna system is adapted for dynamic power configuration and control across a wireless platform such as CDMA, LTE, and similar networks. The antenna system comprises at least one mobile device antenna disposed within a wireless device; the mobile device antenna being adapted for operation over multiple antenna modes by way of adaptive matching, or active null steering. The mobile device is further adapted to communicate with the network over a reverse link signal. The network antenna system further comprises a base transceiver system (BTS) antenna adapted to communicate with one or more mobile devices over a forward link signal. The forward link signal comprises a forward data packet channel and a forward channel control channel, each of which are modulated using techniques known to those of skill in the art.

The mobile device antenna is pre-programmed with one or more data sets or tables for determining within the mobile device one of several antenna modes for performing at optimum efficiency, or over a desired network link, such as a desired BTS. The mobile device is adapted to prepare and send information relating to potential power improvements to a connected BTS via a reverse link signal. The BTS receives and processes the reverse link signal of the mobile device, and communicates an instruction back to the device for altering the mobile device antenna signal, or mode. Instructions sent from the BTS may include desired operational mode for achieving an optimal beam pattern for communicating with a desired BTS or for optimizing signal reception. In this regard, the mobile device is continually updated with modal instructions for optimizing performance of the mobile device and the overall cell.

At the mobile device level, the mobile device antenna includes a modal antenna such as those adapted for beam steering or adaptive matching, otherwise referred to herein as "modal antennas". The mobile device antenna further comprises a baseband or processor for controlling the mode of the antenna. Furthermore, the mode of the mobile device antenna is dynamically assigned by the BTS upon receiving and returning potential signal improvement data processed at the mobile device via a lookup table or other data storage means.

The BTS is programmed across a network to manage and optimize network resources, such as power management and control. For example, where multiple BTS's are disposed in a communication region, and where a first BTS potentially offers increased data access, i.e. an improved link budget, a second BTS being in communication with a mobile wireless device may instruct said device to alter an antenna mode such that a hand-off may be effectuated from the second BTS to the first BTS; thus improving data transfer to the mobile device and collaterally improving resources available at the second BTS since the mobile device no longer loads the tower resources.

According to certain embodiments of the invention, a robust wireless network is provided with an improved antenna system, wherein the wireless network is adapted for power optimization and management, and thus data transfer and download speed management, such that individual wireless devices connected over said network can be dynamically configured to communicate with a BTS having the optimum available budget link for increasing data transfer rates and improving overall communication links. Thus, in certain embodiments of the invention, download speeds can be optimized such that multi-media users may experience an improved connection, especially where relatively large data files are requested.

Additionally, specific absorption rate (SAR) requirements, and other restrictions on wireless communication can be pre-programmed within the antenna system, and more specifically within the antenna system data tables, such that optimum radiation characteristics can be managed and assigned at each mobile device across the network. In this regard, SAR data may be programmed within the device data or memory for preventing operation at potentially harmful radiation patterns.

BRIEF DESCRIPTION OF THE DRAWINGS

These and other attributes of the invention are further described in the following detailed description, particularly when reviewed in conjunction with the drawings, wherein:

FIG. 1c illustrates an exemplary frequency characteristic associated with the antenna of FIG. 1a.

FIG. 6 illustrates a sample data table for programming within a mobile wireless device, the data table includes lookup information such as speed, change in dB, data rate, change in time, and change in SAR vs pattern.

DETAILED DESCRIPTION

Figure 1A:
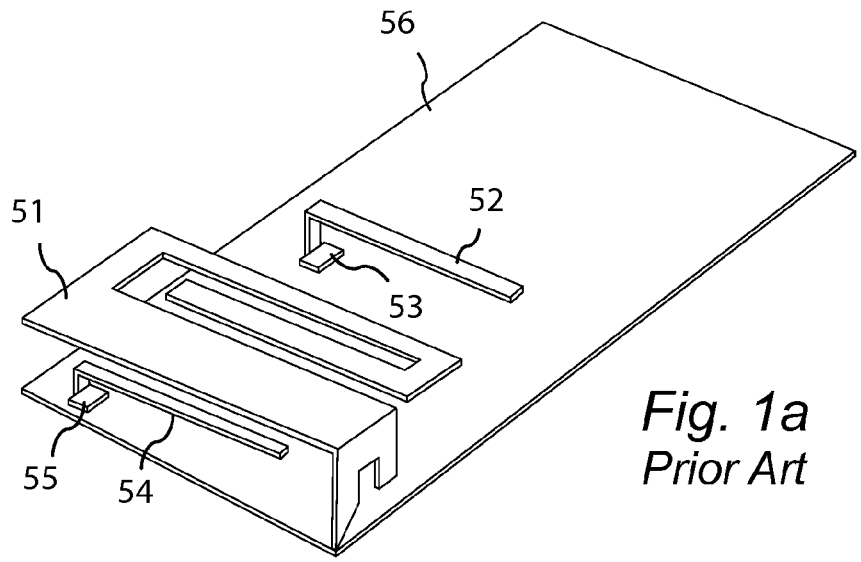
FIG. 1a illustrates an exemplary modal antenna according to commonly owned prior art, the antenna includes a radiator portion and multiple parasitic elements and active elements configured for altering one or more antenna radiation pattern characteristics.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention. Certain embodiments will be described below with reference to the drawings wherein illustrative features are denoted by reference numerals.

In certain general embodiments of the invention, an antenna system is disclosed for use in CDMA, LTE and similar wireless networks. The antenna system is adapted to provide dynamic power management and control such that data can be efficiently exchanged over a wireless network between an end user device and a base station transceiver (BTS). Certain advantages of the antenna system include: selective data optimization for providing increased data transfer speed to certain high-demand clients on the network, dynamic assignment of power level for optimizing network communications and reducing interference between devices, optimization of link budget for each base transceiver on a network, minimizing specific absorption rate by dynamically assigning antenna modes for operation, and the like.

The antenna system includes a base station transceiver (BTS) having one or more antennas thereon for transmitting a forward link signal, and a mobile device antenna disposed within a mobile wireless device, the mobile device antenna being configured to receive a forward link signal and transmit a reverse link signal to the BTS.

Mobile Device Antenna

A mobile device for use over a CDMA, LTE, or other wireless network includes one or more mobile device antennas for receiving and transmitting signals between one or more BTS's across the wireless network.

In certain embodiments of the invention, the mobile device antenna includes a modal antenna for dynamically varying one or more antenna radiation pattern characteristics, such as an adaptive matching antenna or a null steering antenna. An exemplary antenna is illustrated in FIGS. 1(*a-c*), labeled prior art, as is further described in U.S. Pat. No. 7,911,402, titled "ANTENNA AND METHOD FOR STEERING ANTENNA BEAM DIRECTION"; reference may be made thereto for a detailed explanation of the antenna structure and operation. For purposes of this invention, the term "modal antenna" is used to include any antenna being adapted to dynamically vary one or more radiation pattern characteristics.

FIG. 1*a* illustrates a prior art null steering antenna comprising primary radiator 51 disposed above a circuit board 56 and creating a volume of the antenna therebetween. A first parasitic element 54 is disposed within said antenna volume and is connected to an active element 55 for actively configuring the attached parasitic element. A second parasitic element 52 is disposed outside of the antenna volume and adjacent to the primary radiator 51 for steering the antenna radiation pattern, the second parasitic element 52 is further connected to an active element 53.

Figure 1B:
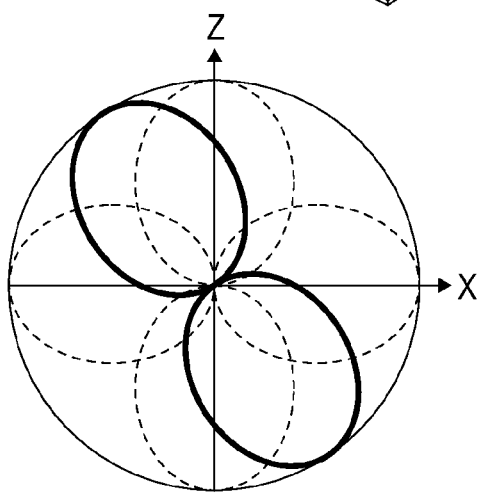
FIG. 1b illustrates an exemplary radiation pattern associated with the antenna of FIG. 1b.

FIG. 1*b* illustrates a two-dimensional antenna radiation pattern associated with a typical modal antenna according to FIG. 1*a*, wherein the pattern 80 is shifted upon actively configuring the second parasitic element 52 from a first mode to a second mode.

Figure 1C:
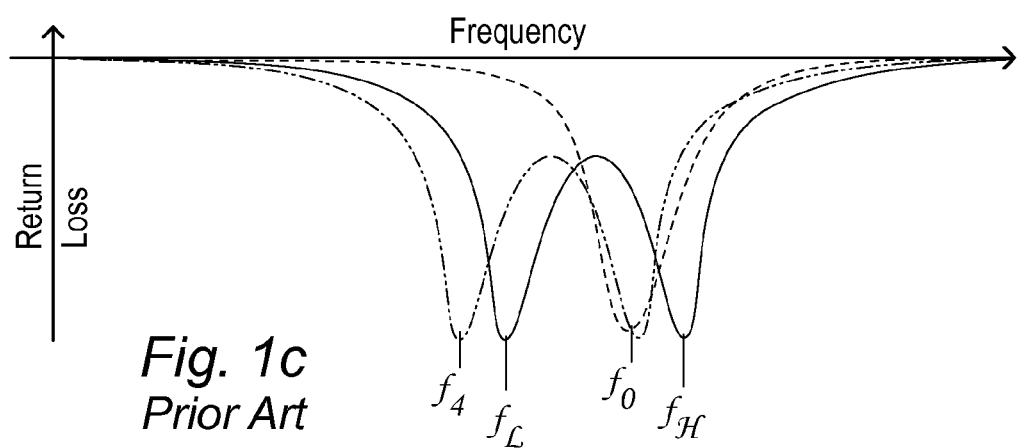

FIG. 1*c* illustrates a typical frequency plot of the modal device antenna of FIG. 1*a*; the frequency of the antenna can be shifted by actively configuring the first parasitic element 54 of the modal antenna.

Figure 1D:
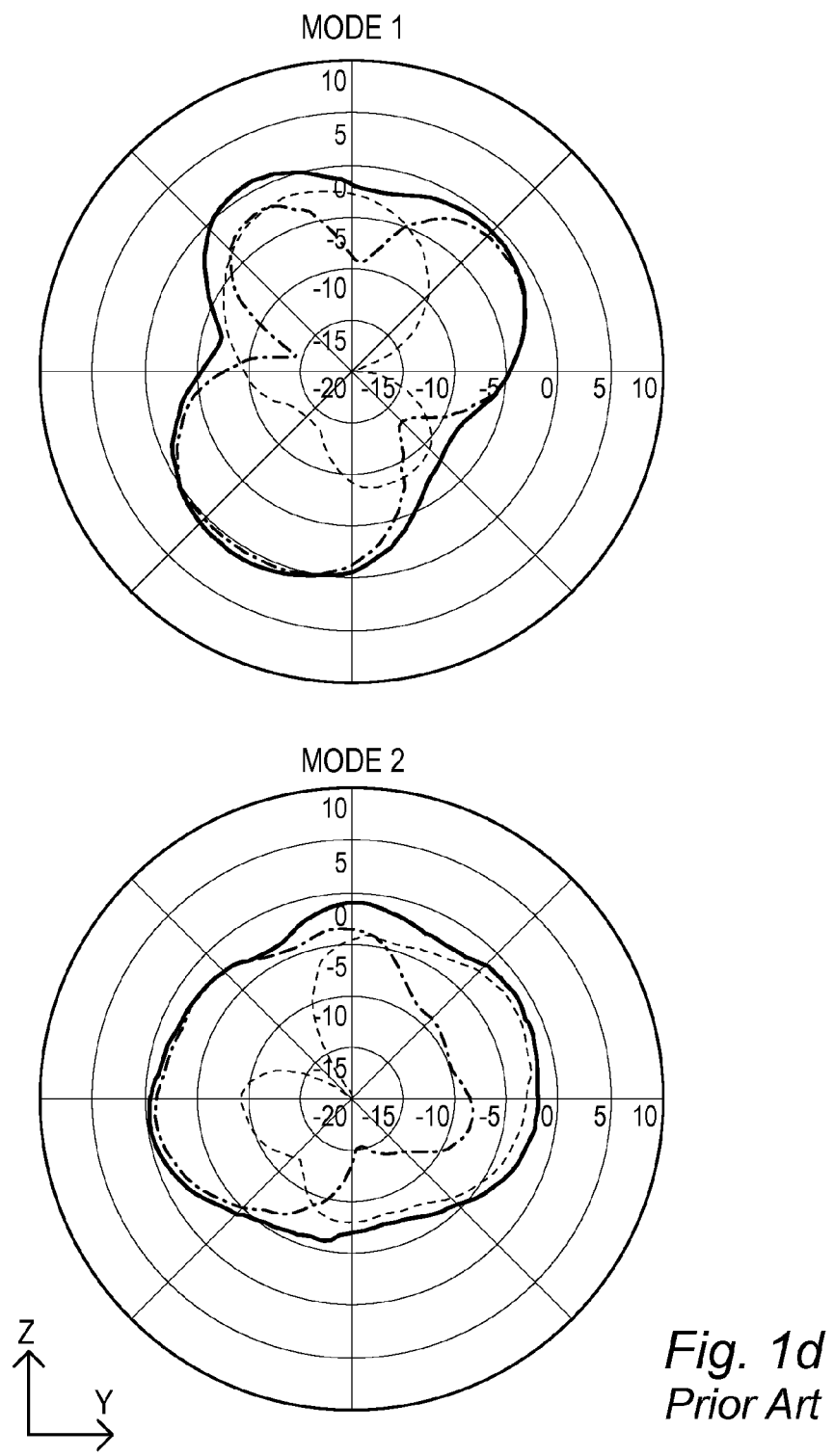
FIG. 1d illustrates the antenna radiation patterns of an exemplary modal device antenna when operating at a first mode, and second mode, respectively.

FIG. 1*d* illustrates the three-dimensional antenna radiation patterns of the modal antenna of FIG. 1*a* as operated at a first mode, and second mode, respectively.

In certain embodiments of the invention, the radiation pattern of a modal antenna can be steered across multiple modes to direct an optimum power level in the desired direction. Accordingly, specific absorption rate can be optimized for the user, power level can be optimized between devices to reduce device interference, and power level can be optimized between a device and the BTS for optimizing data transfer. Additionally, the modal antenna can steer the device to communicate with an alternative BTS on a network.

Base Station Antenna

Various antenna platforms are commercially available for use with base station transceiver applications. These antennas are generally quite large and mounted to a tower and/or building. BTS antennas which are adapted to modify signal characteristics and power or gain have been disclosed in the art, some of which are commercially available.

Two or more BTS's are generally connected over a network, each capable of communicating with a plurality of wireless devices. The BTS's are further adapted to communicate with a network server for determining information related to individual wireless devices connected to the network. Thus, the BTS's are each adapted to lookup information relating to individual wireless devices, such as: location, operation frequency, SAR, and the like. The BST's are further adapted to send antenna mode instructions to each connected device over a forward link signal, wherein each device can effectuate a change in antenna mode to improve communication over the network.

Communication Signal

Figure 2:
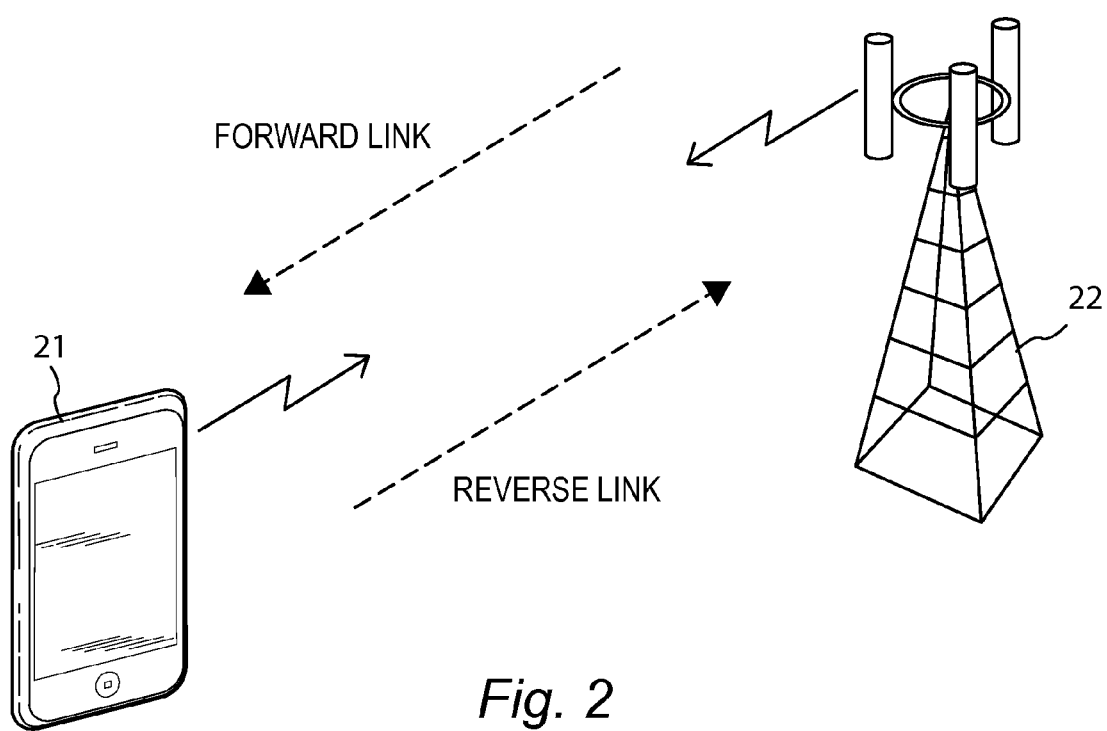
FIG. 2 illustrates a forward link and reverse link through which a mobile wireless device may communicate with a base transceiver system (BTS); the forward link includes a modulated signal comprising a forward packet data channel (FPDC) and a forward channel control channel (FCCC).

In general, one or more mobile wireless devices may be connected to one or more BTS's over a wireless network at a particular instant in time. As these mobile wireless devices migrate geographically, the connection with the network is continued as the mobile wireless device effectuates a "handoff" from a first BTS to a second BTS. The link between a mobile wireless device 21 and a connected BTS 22 generally includes a forward link signal and a reverse link signal, as illustrated in FIG. 2. In order to administer multiple devices within a cell, each adjacent BTS is typically programmed to monitor all frequency channels within a carrier bandwidth, however each adjacent BTS generally transmits and receives signals over a fraction of the total channels, such that nearby BTS's may communicate with other devices without creating interference with a nearby device.

In certain embodiments of the invention, a method is provided for effectuating a hand-off with a nearby BTS such that a particular device might improve link budget access and/or free local BTS data load (increase local link budget) such that other devices may benefit from an improved link budget. Here, a modal antenna and a data table are utilized to transmit potential mode changes for accessing an alternative BTS. The BTS receives the signal and communicates with the BTS server to determine whether a potential link budget improvement exists, and subsequently transmits instructions back to the wireless device. Upon receipt of the BTS' instructions, the processor or baseband configures the antenna accordingly (or alternatively may effectuate no change) such that the antenna switches frequency channels, or remains connected if no improvement can be realized or where SAR requirements would not be met. Accordingly, an artificial hand-off is possible for the purpose of providing or generating an improvement in link budget within a cell.

FIG. 2 illustrates a mobile wireless device, in this case a mobile phone 21, being adapted to send a reverse link signal to a BTS 22 over a wireless network and receive information from a forward link signal. The reverse link generally includes an amount of informational data, such as voice data, and one or more potential improvements modulated to form the reverse link signal. Similarly, the BTS generally emits a forward link to one or more mobile wireless devices on the network, the forward link signal comprises a forward packet data channel for informational data, and a forward channel control channel for power setting instructions. An exemplary method for communicating such instructions over a wireless network can be referenced in U.S. Pat. No. 5,621,723, titled "POWER CONTROL IN A CDMA NETWORK".

In a practical sense, a given BTS sending a forward link signal over a wireless network may be connected to a number of mobile wireless devices. Because power of the BTS signal is divided amongst said number of mobile devices, mobile networks are generally programmed to limit signal to a given mobile wireless device to a threshold minimum whereby a communication link can be sustained. In certain embodiments of the invention, network power can be managed and controlled by determining whether any nearby BTS's may offer one or more mobile wireless devices a link budget improvement upon switching from a first BTS to that available BTS on the network. In this regard, as a mobile wireless device is handed off to another BTS, the power load level of the first BTS is reduced and power can be increased towards remaining mobile devices connected to the first BTS. Furthermore, the mobile wireless device which was handed off to a second BTS where a link budget improvement was available will continue to receive enhanced signal from the improved link budget. Thus, as devices are handed off to BTS's with link budget improvements, resources are made available such that remaining devices also experience a link budget improvement.

Using a modal antenna, mobile wireless devices can be configured to dynamically change radiation pattern characteristics for associating with desired BTS's such that network resources can be managed and controlled for optimization of data transfer rates and download performance.

In another embodiment of the invention, a target device might request a temporary increase in data transfer, such as upon request to download a multi-media file, for example a movie or song. Here, the network can search for link budget improvements on those BTS's in the proximal location of the device, and the antenna mode can be dynamically adjusted to access an improved link budget.

FIGS. 3 and 4 illustrate a link budget improvement handoff as described above. Specifically, FIG. 3 illustrates a first BTS 31a connected to three independent mobile wireless devices 32a, 32b, 34a, or "devices". A second BTS 31b is connected to a fourth device 32c. Here, the load on the first BTS is greater since three devices are connected to the BTS, whereas the load on the second BTS is lesser with merely a single device being connected. In a practical sense, hundreds of devices can be connected to a single BTS, however for illustrative purposes we provide this example showing four devices connected to the system. Now, if the third device 34a required a temporary increase in data transfer, for example upon a request for a multi-media download, the device 34a is adapted to search on the network for a link budget improvement.

Figure 3A:
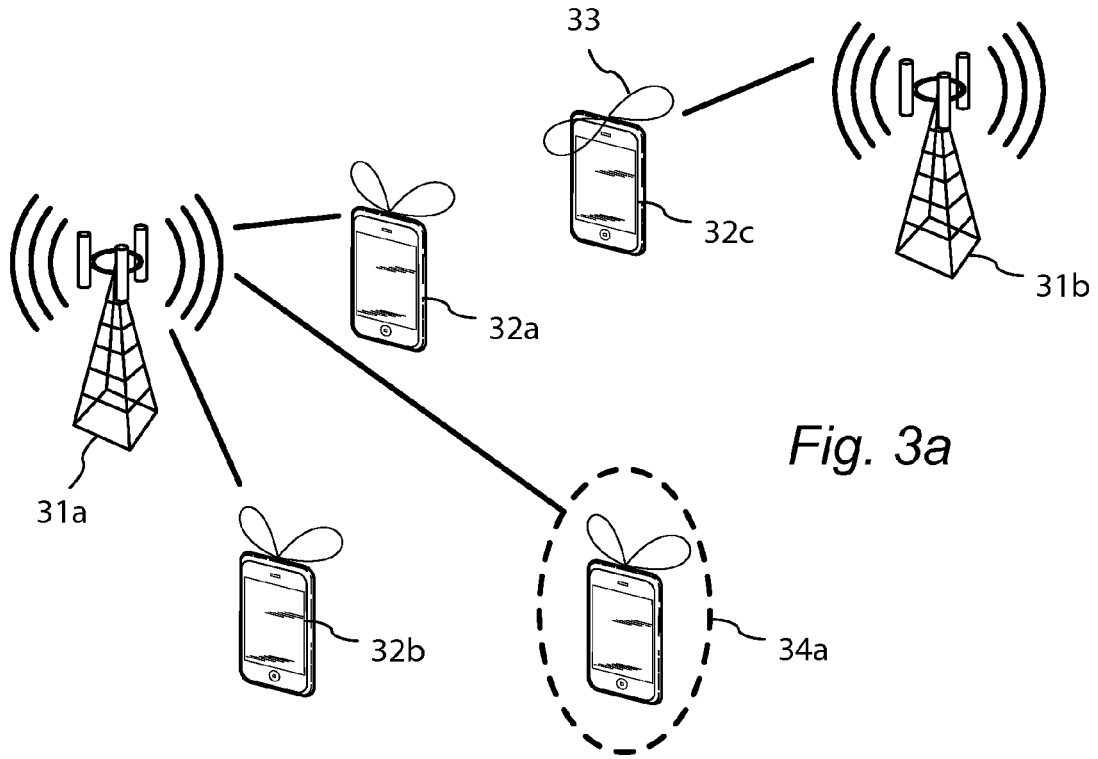
FIG. 3a illustrates a first BTS connected to three mobile wireless devices and a second BTS connected to a fourth mobile wireless device, each mobile wireless device including a modal antenna.
Figure 3B:
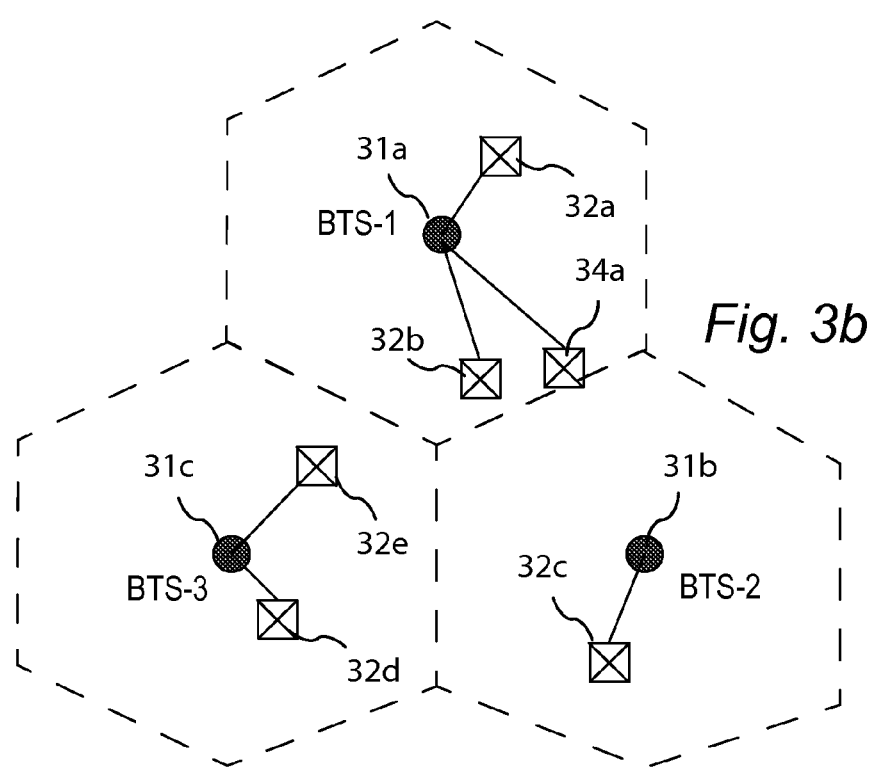
FIG. 3b illustrates two BTS's and four mobile wireless devices according to FIG. 3a, wherein one mobile wireless device is located within common proximity to each of the first and second BTS's.

FIG. 3b further illustrates a geographical representation of FIG. 3a. Because the third device is proximally located to both the first and second BTS's 31a, 31b, a shift in radiation pattern can be effectuated to hand-off the third device 34 to the second BTS 31b as described above. The device 34a may be required to shift one or more of antenna frequency response and antenna radiation pattern, in which case an appropriate mode is selected from a database for accomplishing the handoff.

Here, the third device 34a sends potential changes in the radiation pattern via a lookup table and sub-channel communication on the reverse link, the BTS 31a processes the potential improvements with a server to determine if the antenna should be instructed to enter an alternate mode, and the BTS 31a sends instructions for operating the antenna mode via a forward link packet transmission. The third device 34a then alters the antenna mode, and a hand-off is effectuated to a nearby BTS 31b offering an improved link budget.

Figure 4A:
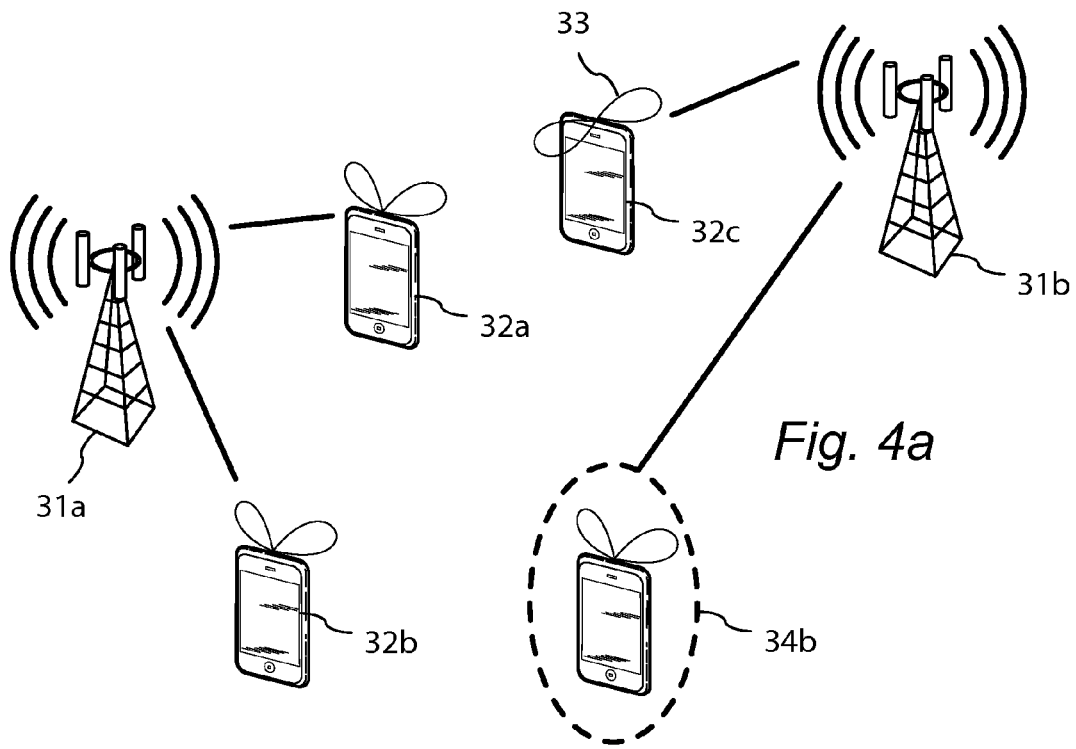
FIG. 4a illustrates two BTS's and four mobile wireless devices according to the embodiment FIG. 3a, wherein one of the four mobile wireless devices exhibits a modified beam pattern for connecting to the second BTS, such that each BTS effectively distributes power to each of the mobile devices in proximity therewith for optimizing data transfer between each connected mobile device and the wireless network.

FIG. 4a illustrates the first and second BTS's 31a-b and four connected devices 32a, 32b, 32c, 34a subsequent to the hand-off. Here, the first BTS 31a is now loaded by only two devices 32a, 32b, and the third device 34b is receiving an improved link budget signal from the second BTS 31b.

Figure 4B:
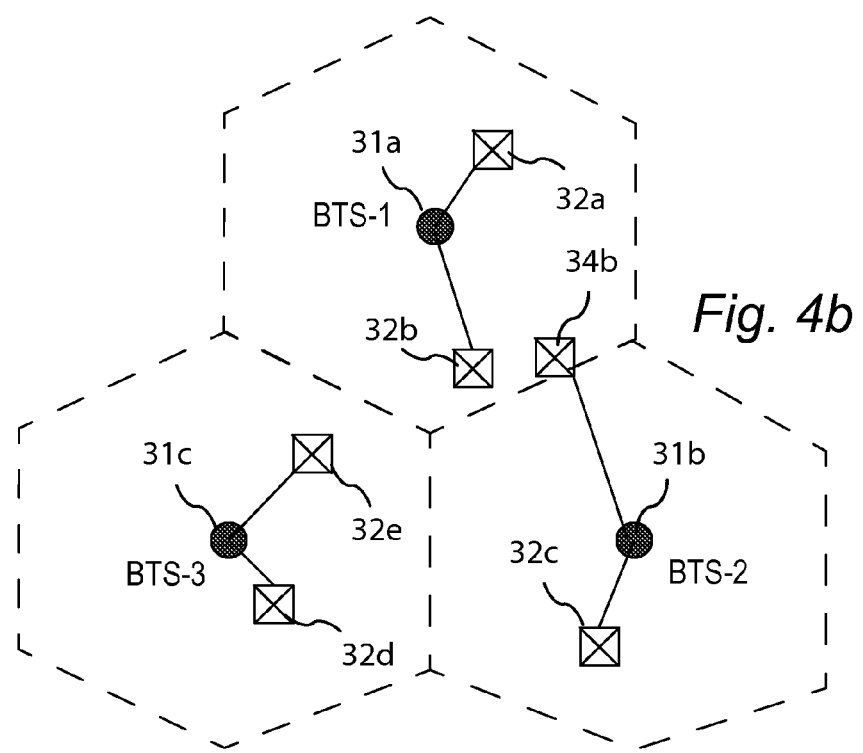
FIG. 4b illustrates a schematic representation of the two BTS's and four mobile wireless devices of FIG. 4a, wherein one of said mobile wireless devices is configured to link with a second BTS upon shifting the antenna beam pattern of the modal antenna within the mobile wireless device.

FIG. 4b further illustrates a geographical representation of the network as illustrated in FIG. 4a. As can be viewed, the network is effectively balanced and power is managed for optimization of data transfer. A third base station 31c includes additional mobile devices 32d, 32e connected therewith.

In this regard, the network is adapted to instruct one or more devices connected thereon for entering specific antenna modes and communicating with preferred base transceiver stations such that link budget is actively optimized for one or more of: an individual subscriber device, or a BTS cell having multiple devices connected therewith.

Antenna Adapted for Power Management and Control

Figure 5:
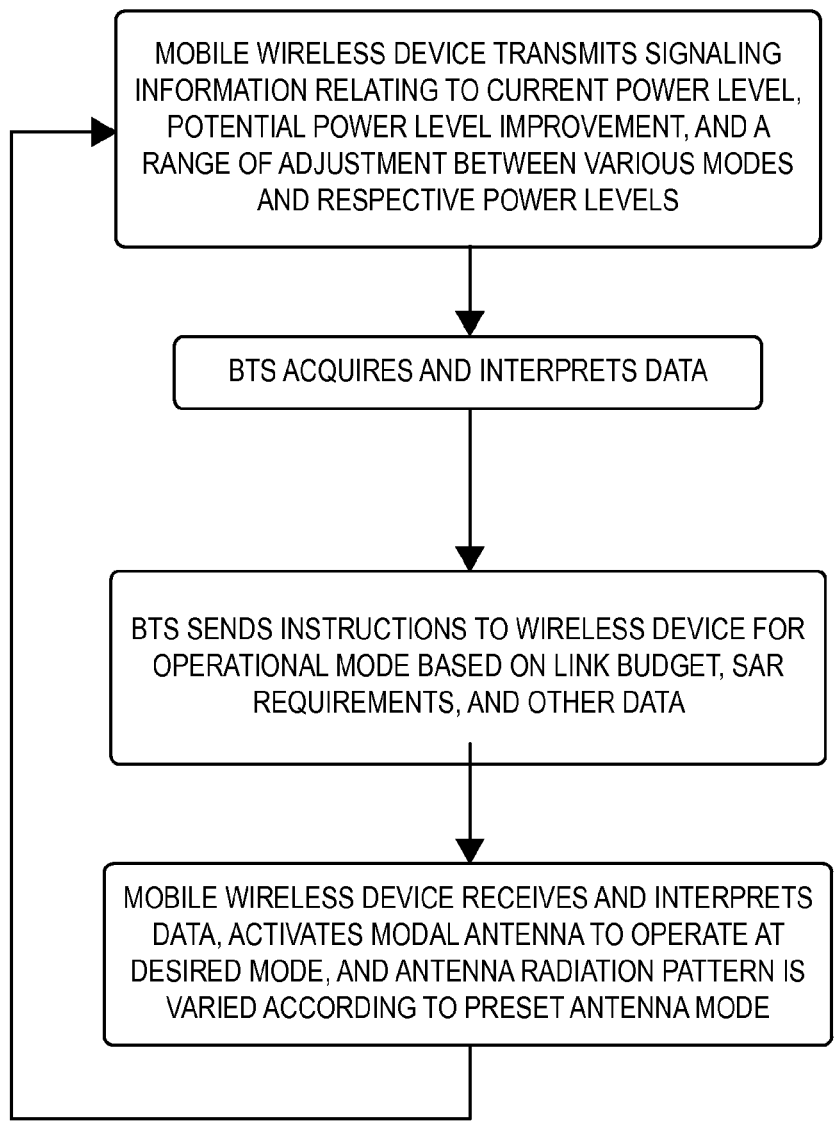
FIG. 5 is a block diagram representing a method for power management and control over a wireless network.

According to these and other embodiments, an antenna system can be configured in accordance with a method for improving link budget access within a cell as illustrated in FIG. 5. The method comprising, (i) providing a wireless device comprising a modal antenna and a memory for storing one or more data tables for containing one or more of: speed, change in dB, data rate requested vs. target, change in time, and SAR vs. antenna pattern change; (ii) transmitting signaling info to a connected BTS, the signaling info comprising one or more of: current power level, potential margin for improvement, and range of adjustment; (iii) receiving said signaling info at said BTS; processing said signaling info to generate a mode instruction relating to mobile device antenna improvement, and transmitting said mode instruction from said BTS to said mobile wireless device; and (iv) receiving said mode instruction at said wireless device and effectuating an antenna mode change effectively varying the antenna mode to modify one or more antenna radiation pattern characteristics. FIG. 5 illustrates a flow chart summarizing this method.

FIG. 6 further illustrates an exemplary data table for programming into a mobile device memory and utilizing in a method such as described in FIG. 5. The data table may comprise information relating to multiple networks, especially for use with multi-band/multi-mode devices utilizing two or more of GSM, LTE, CDMA, platforms or over multiple countries where multi-band antennas are required.

Figure 7:
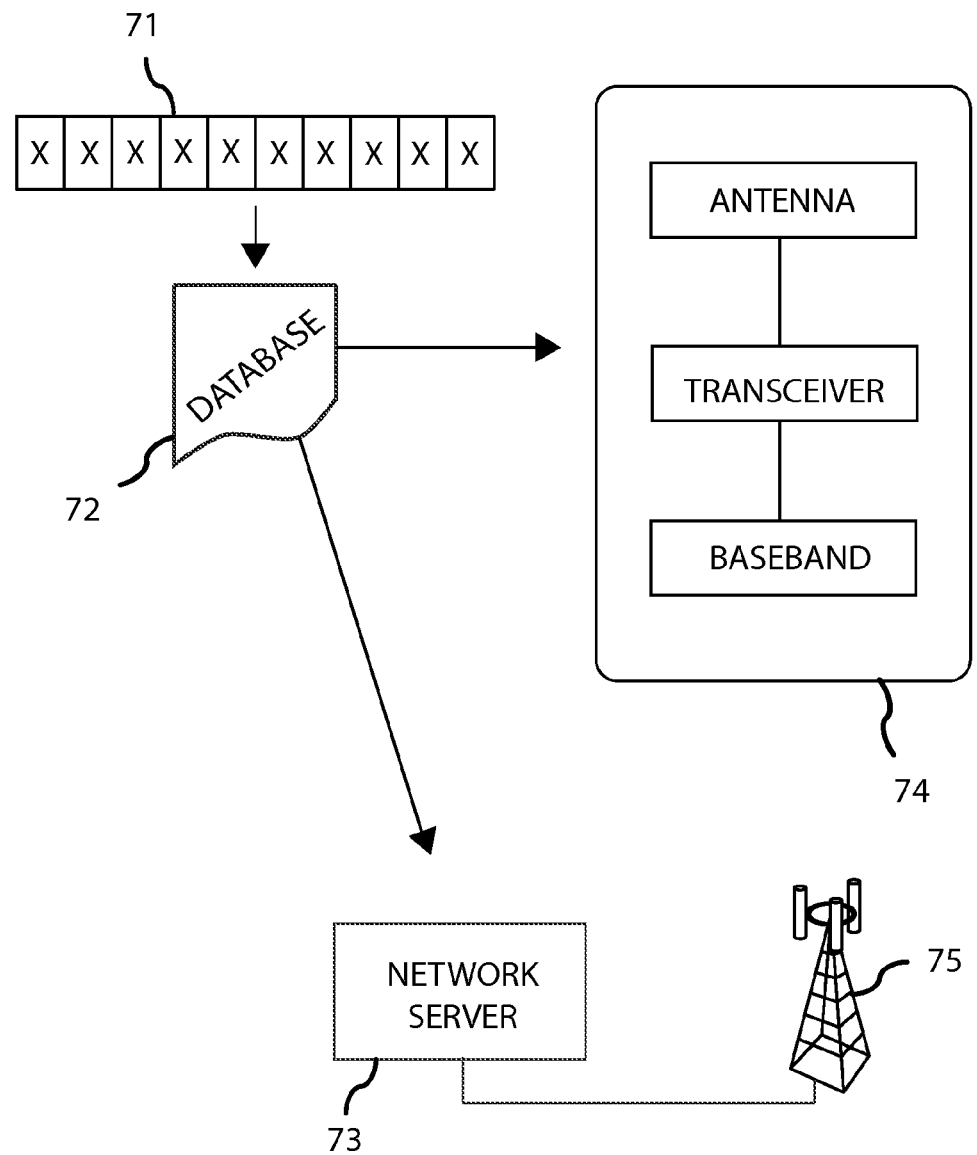
FIG. 7 illustrates a mobile wireless device having a modal antenna, the mobile wireless device is configured for selectively connecting to one or more BTS's across a network, wherein a selected BTS is determined using a lookup table and available budget link improvements about said wireless network.

FIG. 7 illustrates a BTS 75 connected to a network server 73, and a mobile wireless device 74 such as a cell phone, laptop, media device, or other mobile wireless device being connected to the network at the BTS. Each device connected to the network may comprise a unique code identifier 71 for identifying the device on the network. Using the unique code identifier, a server 73 is capable of looking up information related to the link budget and connection characteristics of the device 74. Furthermore, the server is capable of looking up a database table 72 to determine one or more potential antenna modes for improving link budget or other enhancements. Alternatively, the mobile device may be programmed with a memory for storing one or more data tables for accessing information relating to potential improvements and antenna modes associated therewith. In this regard, the data tables may reside in the end user device or on a network server, or both.

Figure 8:
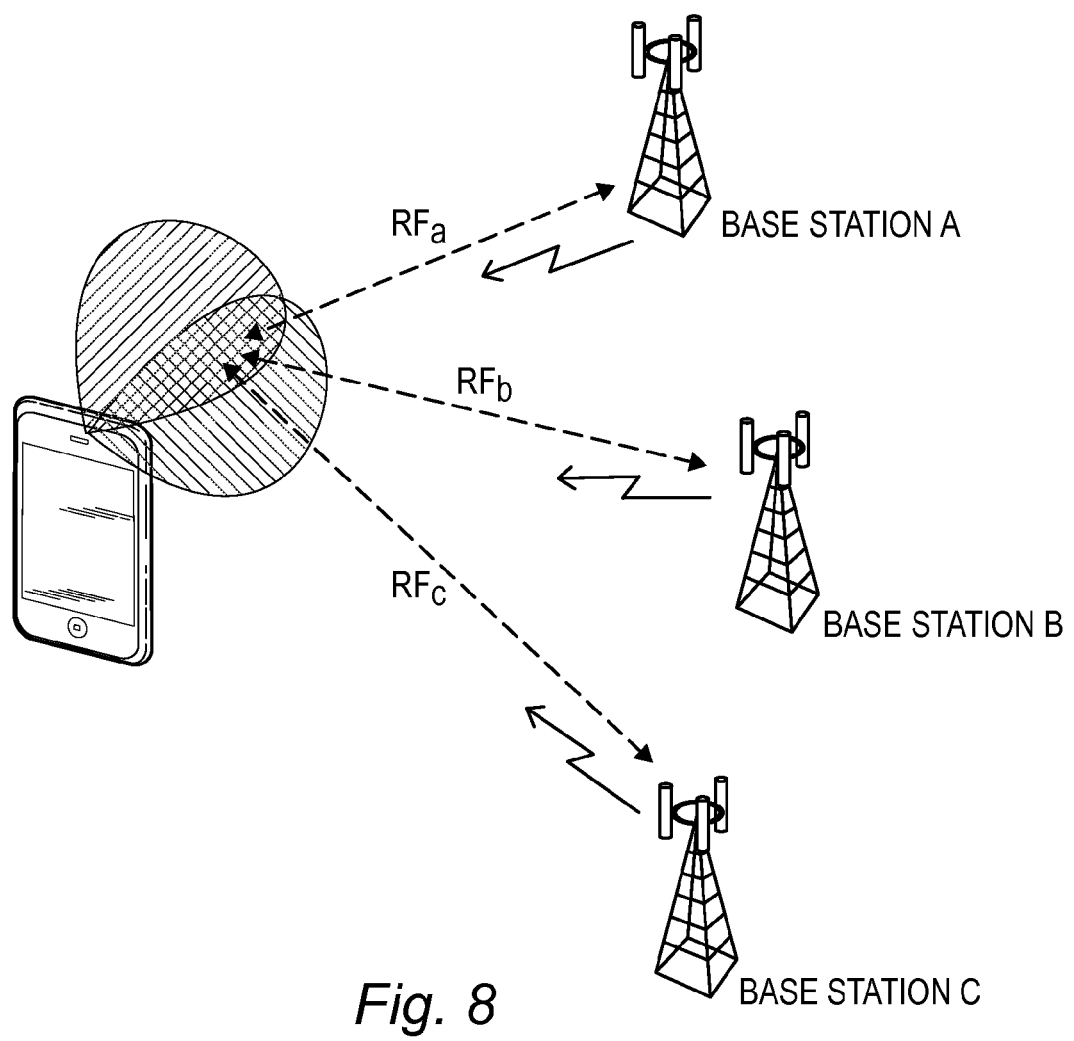
FIG. 8 further illustrates an embodiment with a mobile device disposed within proximity to three adjacent BTS's, or cell sites.

FIG. 8 further illustrates a mobile device disposed within proximity to three adjacent BTS's, or cell sites. The mobile device includes a modal antenna for dynamically varying antenna radiation pattern characteristics. Here, for each of the cells RFa, RFb, and RFc, a knowledge of the link budget and delta versus the maximum gain of the antenna is stored in the device memory. The pilot and exchange with the BTS further provides the allowance of data rate within the cell. If the cell is saturated at BTS(A), the mobile will remain in use with BTS(B). However, if the overall link provides a possible improvement in link budget such that the requested data rate is possible, the mobile device will receive instructions to alter the antenna radiation pattern and access BTS(C). It should be noted that the data table will further provide SAR data such that a BS switch will be prevented where a harmful radiation pattern will result.

Figure 9:
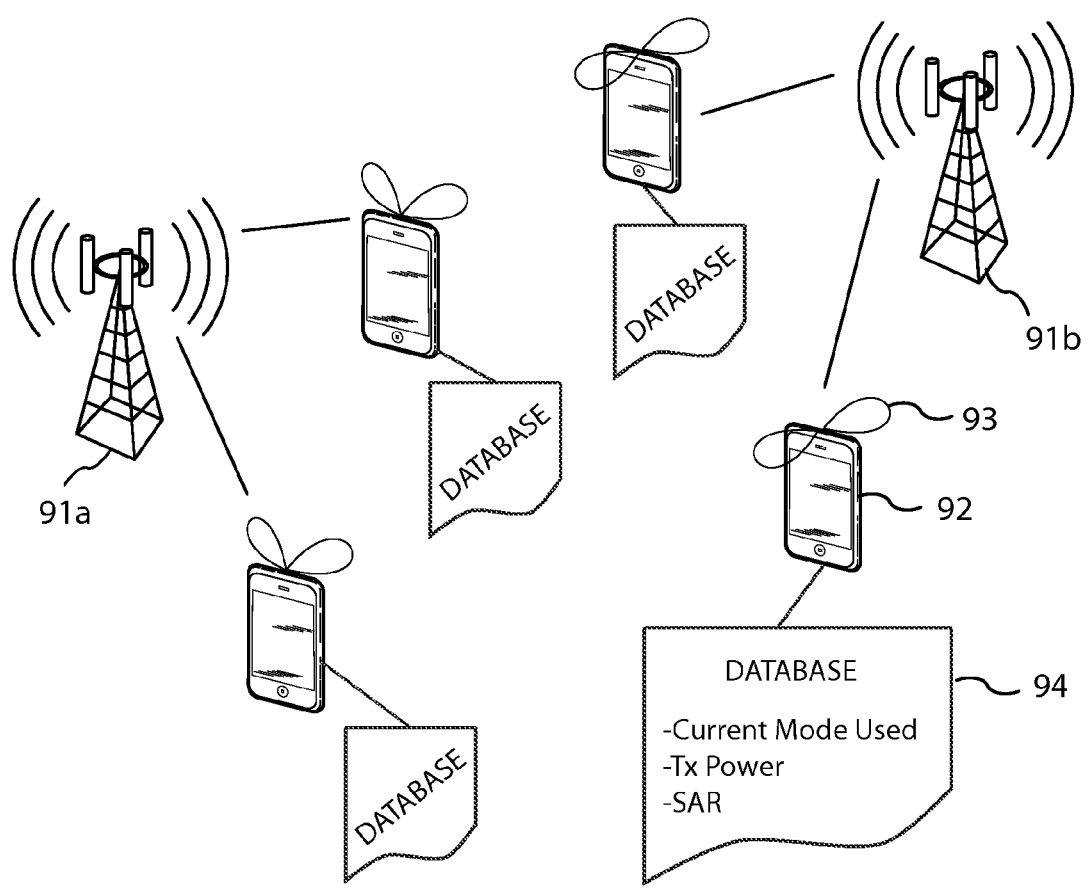
FIG. 9 illustrates a schematic of a wireless network wherein one or more wireless devices are connected to at least one BTS by a wireless communications link.

FIG. 9 illustrates a schematic of a wireless network wherein one or more wireless devices 92 are connected to at least one BTS 91b by a wireless communications link. The wireless communications link can comprise one or more antenna frequencies for communicating with a desired BTS within a cell. In addition to antenna frequency, the antenna mode 93 selected for effectuating the communications link may be selected to further enhance transmit power, SAR, throughput, and the like. In FIG. 9, one or more of the wireless devices 92 further comprise a memory and database 94, the database including one or more lookup tables having information related to one or more antenna modes and radiation pattern characteristics associated therewith. In this regards, the selected mode can be configured based on frequency response, transmit power, specific absorption rate (SAR), and other antenna radiation pattern characteristics.

Figure 10:
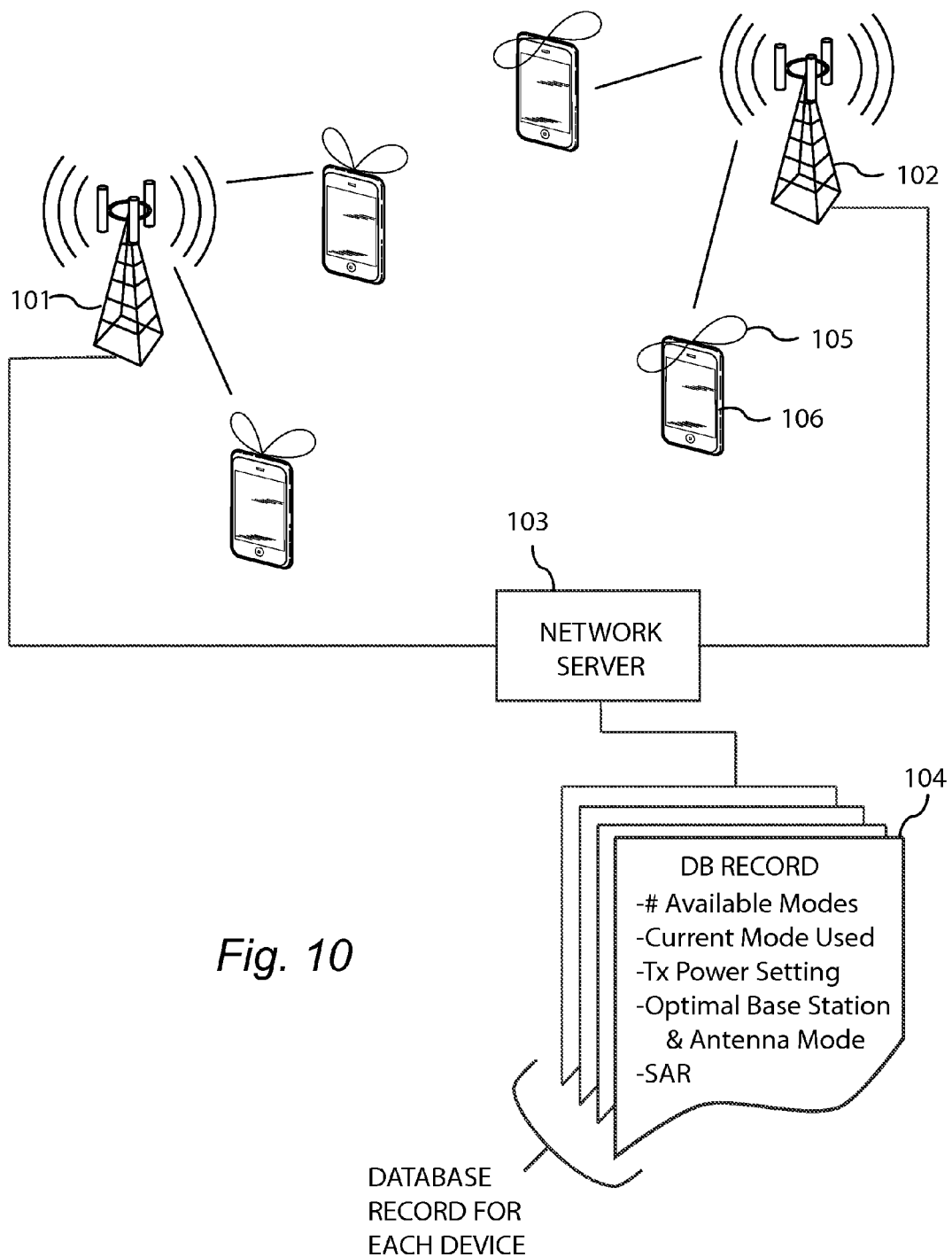
FIG. 10 illustrates another schematic of a wireless network wherein the network further comprises one or more network servers being connected to one or more BTS's.

FIG. 10 illustrates another schematic of a wireless network wherein the network further comprises one or more network servers 103 being connected to one or more BTS's 101, 102. The network server can be configured to store in memory one or more data tables each relating to a particular subscriber device and numerated by a unique code identifier. The data tables further comprise one or more database records for up to several antenna modes configurable within the subscriber device, wherein each database record further includes a plurality of associated mode parameters as illustrated in FIG. 6. Additionally, the database may can be configured for relating information of nearby BTS's and link budget thereof. In this regard, the network system is adapted to monitor one or more mobile wireless devices connected thereon, and to actively lookup potential link budget improvements for each device and manage network resources by assigning optimum modes to each connected device. One assigned an antenna mode, the antenna implements the mode using a modal device antenna. In this regard, the network system is capable of dynamic power management and control of wireless devices connected thereon.

Figure 11:
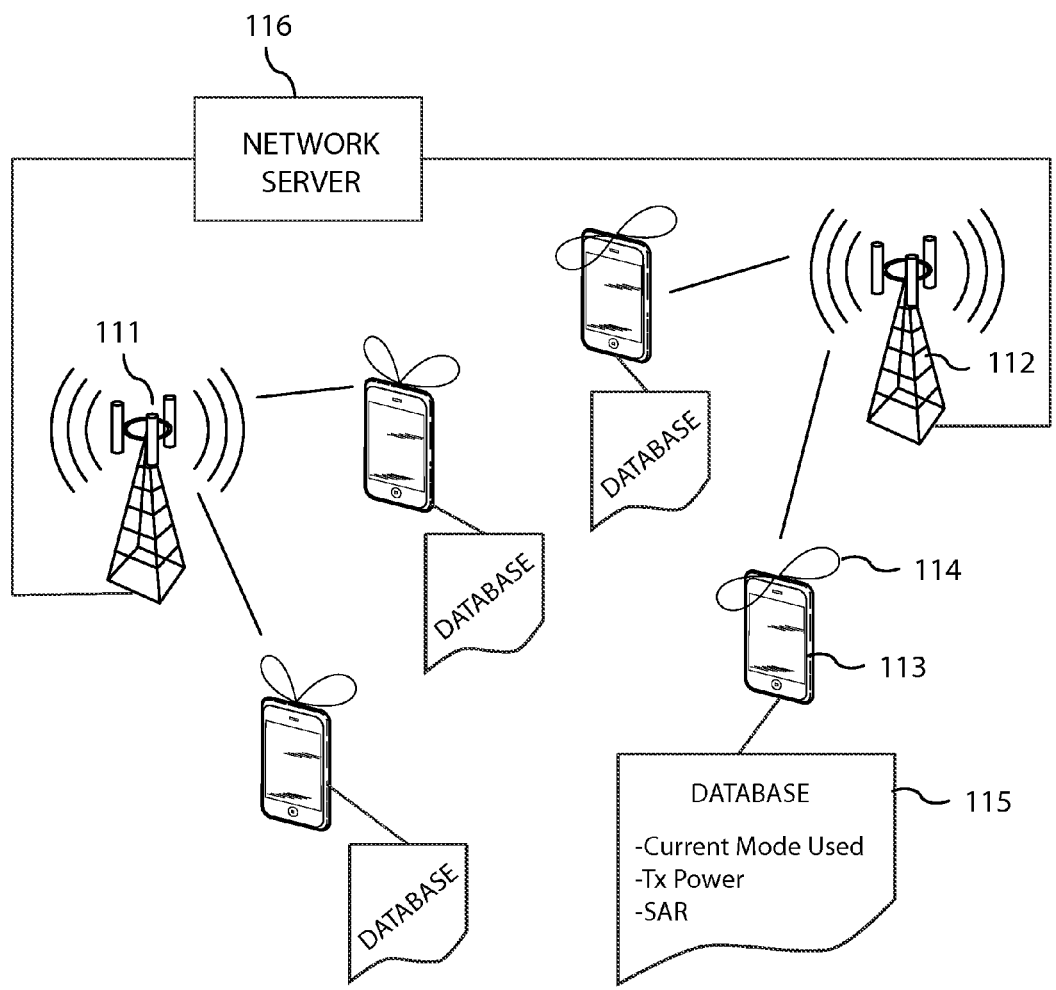
FIG. 11 illustrates another schematic of a wireless network, wherein one or more wireless devices comprises a memory and database for actively selecting an optimum antenna mode, and one or more BTS's are connected to a network server for looking up information against a comprehensive database of several subscriber devices being connected to the network.

FIG. 11 illustrates another schematic of a wireless network, wherein one or more wireless devices 113 comprises a memory and database 115 for actively selecting an optimum antenna mode, and one or more BTS's 111, 112 are connected to a network server 116 for looking up information against a comprehensive database of several subscriber devices being connected to the network. In this regard, the individual devices having modal antennas and databases are configured to lookup one or more modes for enhancing device-level communication improvements such as increased download speed, reduced interference for reducing power consumption, and the like. Furthermore, the network is adapted to lookup database records for each connected subscriber device against a comprehensive subscriber database for determining potential link budget improvements for one or more BTS' on the network. Where a potential improvement is determined by the network server, instructions are sent to one or more target wireless devices for effectuating an antenna mode change for reducing transmit power, switching to a nearby BTS, or other enhancement.

The above examples are set forth for illustrative purposes and are not intended to limit the spirit and scope of the invention. One having skill in the art will recognize that deviations from the aforementioned examples can be created which substantially perform the same functions and obtain similar results.

What is claimed is:

1. In a wireless communication network, an antenna system, comprising:
   at least one wireless device comprising a modal device antenna adapted for operation at a plurality of antenna modes, each of said antenna modes having a distinct antenna radiation pattern, said wireless device being further adapted to transmit signal data to the wireless communication network over a reverse link;
   said modal antenna being further connected to a memory module for storing information related to said plurality of antenna modes; and
   a base station transceiver adapted to receive said signal data of said wireless device over said reverse link, process said signal data, and transmit mode instructions to said mobile device over a forward link, wherein said mode instructions are adapted to configure said modal device antenna of the wireless device for operation at a desired antenna mode.

2. The antenna system of claim 1, wherein said modal device antenna comprises a primary radiator, at least one parasitic element disposed adjacent to said primary radiator, and one or more active elements coupled to said at least one parasitic element; wherein said modal antenna is adapted to switch between two or more antenna modes by actively adjusting said at least one parasitic element and one or more active elements coupled therewith.

3. The antenna system of claim 1, wherein said memory module is programmed with data for relating each of said plurality of antenna modes with one or more of: signal power (dB), specific absorption rate, and frequency.

4. The antenna system of claim 1, wherein said modal device antenna is configured to switch between a first antenna mode and a second antenna mode.

5. The antenna system of claim 4, wherein an antenna radiation pattern associated with said second mode provides up to a 20 dB power reduction in the direction of said base station receiver with respect to said first antenna mode.

6. The antenna system of claim 1, wherein a plurality of wireless devices are in communication with said base station transceiver.

7. The antenna system of claim 6, wherein a first base station transceiver and a second base station transceiver are individually adapted for communication with said plurality of wireless devices.

8. The antenna system of claim 7, wherein each of said plurality of wireless devices is individually configured for operation at a desired antenna mode such that a link budget of said first and second base station transceivers is optimized.

9. The antenna system of claim 8, wherein said wireless devices having a modal antenna are individually adapted to switch from a first base station transceiver to a second base station transceiver for optimizing one or more of: data transfer rate, device interference, and link budget.

10. In a wireless communication network, a method for power management and control, comprising:
 providing at least one wireless device comprising a modal device antenna adapted to vary one or more antenna radiation pattern characteristics thereof for operation over a plurality of antenna modes, wherein said modal device antenna is adapted to provide a distinct radiation pattern at each of said antenna modes;
 providing a base station transceiver connected to a network database server;
 sending a reverse link signal from said wireless device to said base station transceiver, said reverse link signal comprising link data including one or more of: signal power, power associated with one or more alternative antenna modes, and specific absorption rate associated with said one or more alternative antenna modes;
 processing said reverse link signal at said base station transceiver for determining a desired antenna mode based on said link data; and
 sending instructions over a forward link signal from said base station transceiver to said wireless device for configuring operation of the modal device antenna at said desired antenna mode.

11. The method of claim 10, wherein said desired antenna mode is configured for reducing signal power of the modal device antenna.

12. The method of claim 10, wherein a plurality of wireless devices are connected to a network of base station transceivers, and wherein each device is individually configured to operate at an optimal antenna mode such that link budget of said network of base station transceivers is optimized.

13. The method of claim 10, wherein one of said at least one wireless device is handed off from a first base station transceiver to a second base station transceiver for reducing load on said first base station transceiver and increasing download speed of the wireless device being connected to the second base station transceiver.

* * * * *